United States Patent
Yabe et al.

(10) Patent No.: US 9,948,159 B2
(45) Date of Patent: Apr. 17, 2018

(54) STATOR SUPPORTING STRUCTURE FOR ROTATING ELECTRICAL MACHINE AND ROTATING ELECTRICAL MACHINE INCLUDING THE SAME

(71) Applicant: Nissan Motor Co., Ltd., Yokohama-shi, Kanagawa (JP)

(72) Inventors: Tadashi Yabe, Ebina (JP); Masahiko Koudou, Yokohama (JP); Souichi Maihara, Sagamihara (JP)

(73) Assignee: Nissan Motor Co., Ltd., Yokohama (JP)

(*) Notice: Subject to any disclaimer, the term of this patent is extended or adjusted under 35 U.S.C. 154(b) by 291 days.

(21) Appl. No.: 14/758,358

(22) PCT Filed: Jan. 16, 2014

(86) PCT No.: PCT/JP2014/050707
§ 371 (c)(1),
(2) Date: Jun. 29, 2015

(87) PCT Pub. No.: WO2014/125864
PCT Pub. Date: Aug. 21, 2014

(65) Prior Publication Data
US 2016/0036291 A1    Feb. 4, 2016

(30) Foreign Application Priority Data

Feb. 12, 2013    (JP) .................................. 2013-024361

(51) Int. Cl.
*H02K 5/24*       (2006.01)
*H02K 1/18*       (2006.01)
*B60K 7/00*       (2006.01)

(52) U.S. Cl.
CPC ............ *H02K 5/24* (2013.01); *B60K 7/0007* (2013.01); *H02K 1/185* (2013.01); *B60K 2007/0038* (2013.01); *B60K 2007/0092* (2013.01)

(58) Field of Classification Search
CPC ........ H02K 1/185; H02K 5/24; B60K 7/0007; B60K 2007/0092; B60K 2007/0038
(Continued)

(56) References Cited

U.S. PATENT DOCUMENTS 2,500,751 A * 3/1950 Halfvarson ............. F25B 31/02
                                                    184/6.18
4,894,574 A * 1/1990 Ragaly ..................... H02K 5/24
                                                    310/216.114
(Continued)

FOREIGN PATENT DOCUMENTS

| CN | 101553970 A | 10/2009 |
|---|---|---|
| JP | 63-501329 A | 5/1988 |

(Continued)

*Primary Examiner* — John K Kim
(74) *Attorney, Agent, or Firm* — Global IP Counselors, LLP

(57) ABSTRACT

A rotating electrical machine includes an annular stator, a motor case, and an inner frame. The motor case is disposed radially outward of the stator with a prescribed radial gap. The inner frame fixedly supports one end of the stator in the axial direction of the motor case. The inner frame includes a bolt fastening portion coupled to the one end of the stator without being coupled to the motor case, a bolt fastening portion coupled to the motor case without being coupled to the one end of the stator, and a connecting portion connecting the bolt fastening section and the bolt fastening section. The radial rigidity at the connection section of the inner frame is configured to be lower than the radial rigidity of a bottom section of the motor case.

14 Claims, 5 Drawing Sheets

(58) Field of Classification Search
USPC .................................................. 310/51, 89
IPC ...................................................... H02K 5/24
See application file for complete search history.

(56) References Cited

U.S. PATENT DOCUMENTS

| | | | | |
|---|---|---|---|---|
| 5,538,404 | A * | 7/1996 | DiFlora ............... | F04B 39/0033 |
| | | | | 181/200 |
| 8,587,173 | B2 * | 11/2013 | Kurosawa ............... | H02K 5/24 |
| | | | | 310/51 |
| 2016/0036291 | A1 * | 2/2016 | Yabe ..................... | H02K 1/185 |
| | | | | 310/89 |

FOREIGN PATENT DOCUMENTS

| | | |
|---|---|---|
| JP | 2003-134732 A | 5/2003 |
| JP | 2006-238558 A | 9/2006 |
| JP | 2010-124661 A | 6/2010 |

* cited by examiner

… (1)

STATOR SUPPORTING STRUCTURE FOR ROTATING ELECTRICAL MACHINE AND ROTATING ELECTRICAL MACHINE INCLUDING THE SAME

CROSS-REFERENCE TO RELATED APPLICATIONS

This application is a U.S. National stage application of International Application No. PCT/JP2014/050707, filed Jan. 16, 2014, which claims priority to Japanese Patent Application No. 2013-024361 filed in Japan on Feb. 12, 2013, the contents of each of which is hereby incorporated herein by reference.

BACKGROUND

Field of the Invention

The present invention relates to a rotating electrical machine.

Background Information

Conventionally, a rotating electrical machine or a rotary electric machine is known in which a stator is accommodated or housed in a motor case (housing). For example, in the rotating electrical machine described in JP 2006-238558 A, an annular stator is fastened to the motor case via a plurality of bolts.

SUMMARY

However, in the conventional rotating electrical machine, an electromagnetic exciting force of the stator (excitation force) is directly transmitted to the motor case. Thus, a problem arises that noise may be emitted to the outside of the motor case. The present invention has been made in view of this problem and is intended to provide a rotating electrical machine that may suppress noise.

For this purpose, the rotating electrical machine according to the present invention has a support member for fixedly supporting one end of the axial direction of a stator, the support member including a first coupling portion coupled to one end of the stator away from the motor case, a second coupling portion coupled to the motor case away from the one end of the stator, and a connecting portion that connects the first coupling portion and the second coupling portion. Further, the rigidity or stiffness of the connecting portion of the support member in the radial direction, i.e. the radial rigidity is configured to be lower than the radial rigidity of a portion of the motor case for supporting the stator via the support member.

The connecting portion of the support member attenuates the radial electromagnetic excitation force of the stator and transmits the same to the motor case. Here, the radial stiffness in the connection portion of the support member is set lowered than that of the motor case. Therefore, it is possible to more effectively suppress the noise.

BRIEF DESCRIPTION OF THE DRAWINGS

Referring now to the attached drawings which form a part of this original disclosure.

DETAILED DESCRIPTION OF THE EMBODIMENTS

Below, description is given in detail of embodiments according to the present invention with reference to the illustrated embodiment.

First Embodiment

Configuration

First, a description is given of the configuration. A rotating electrical machine of the present embodiment (hereinafter referred to as a motor 1) is used for an in-wheel motor (wheel driving unit) for an electric vehicle, and is installed at each wheel to enable vehicle propulsion by driving the wheels individually. The motor 1 is housed inside a wheel support member (not shown) for rotatably supporting the wheel. The motor 1 is a three-phase AC motor, and functions as an electric motor (motor) during discharge of the power source (battery) and generates power by applying a three-phase alternating current supplied from an inverter to a stator coil. During battery charging, the motor functions as a generator and supplies three-phase alternating current from the stator coil to the inverter. In addition, the motor 1 may be used for a drive unit for a hybrid vehicle and the like. The use is thus not particularly limited. Further, the motor 1 is not limited to the three-phase AC motor.

Figure 1:
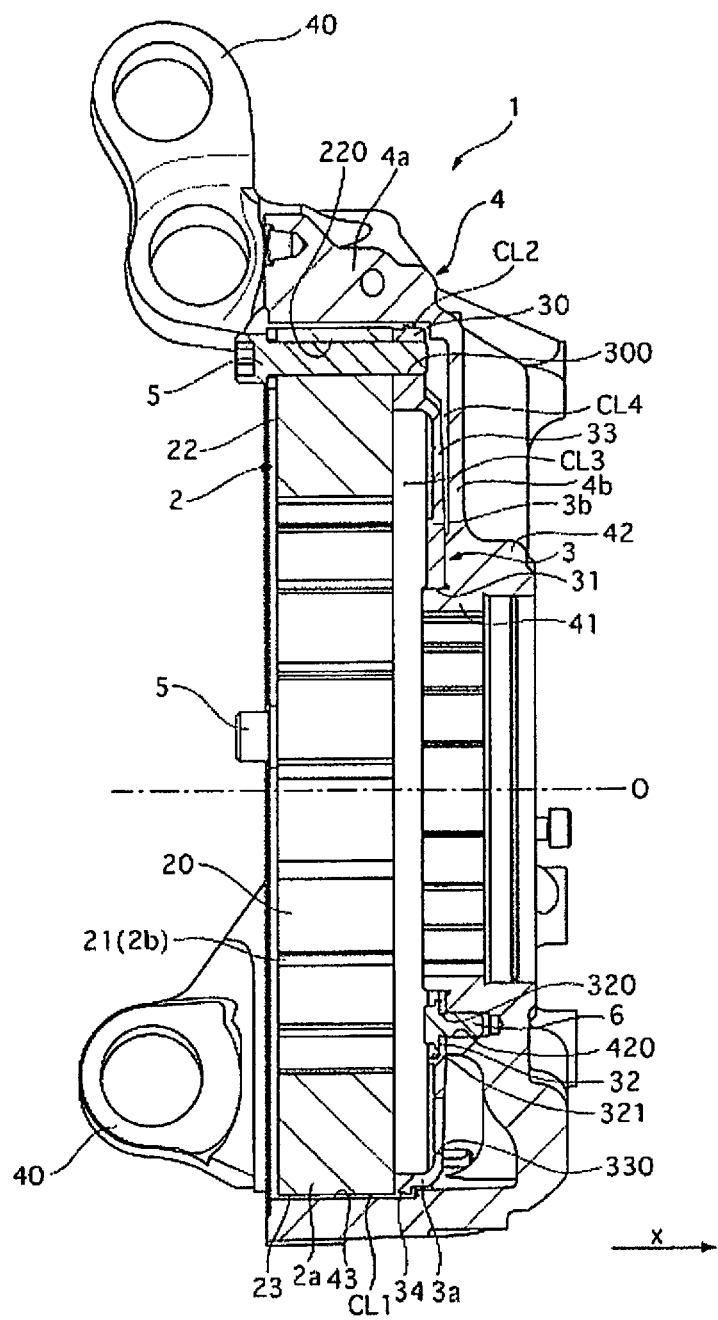
FIG. 1 shows a motor of a first embodiment in a cross-section taken along a plane passing through the axis O thereof.
Figure 2:
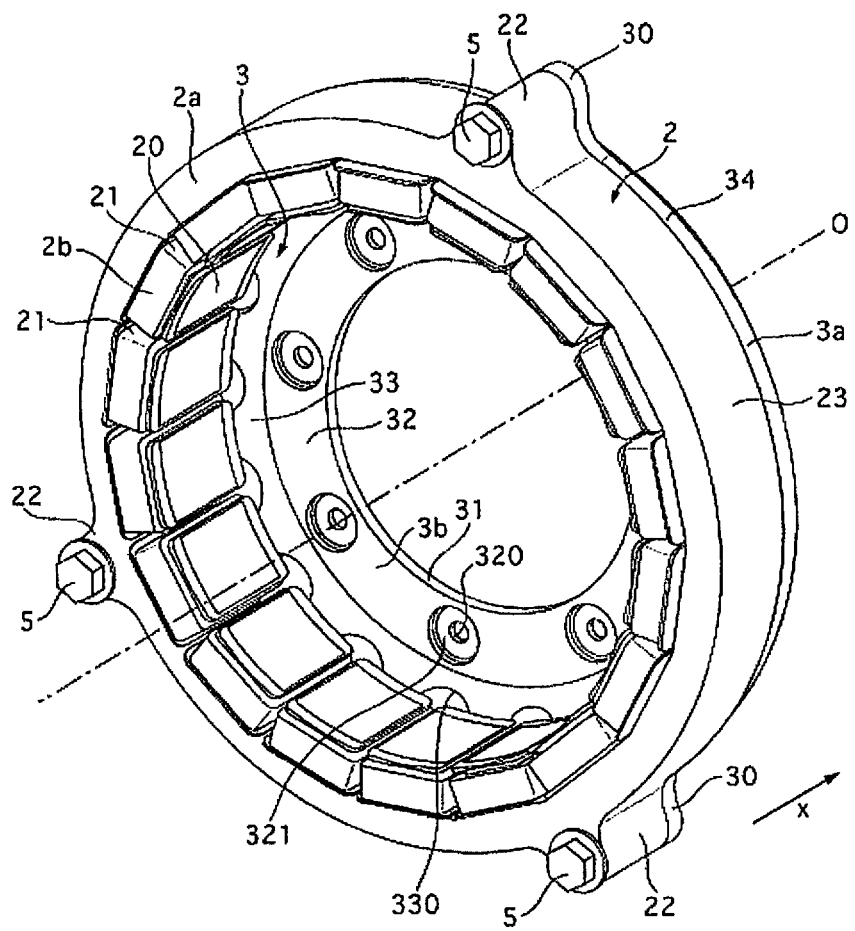
FIG. 2 is a perspective view of an assembly of the stator and the inner frame of the first embodiment seen from the x-axis negative direction.
Figure 3:
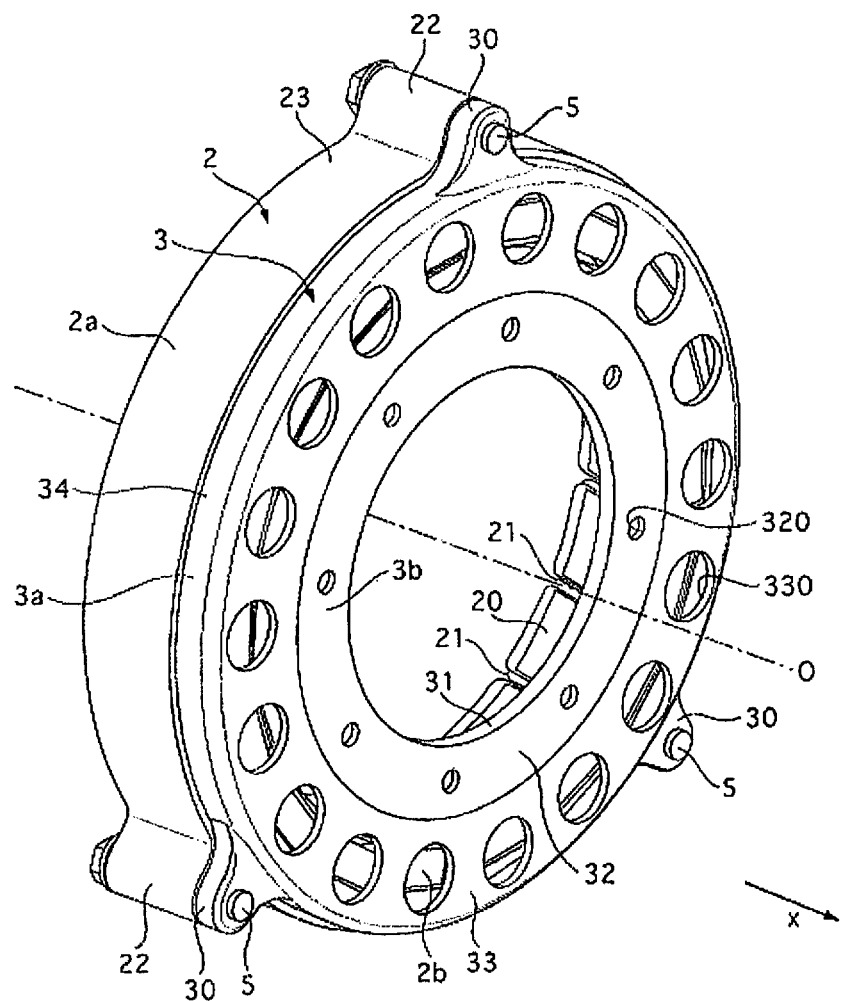
FIG. 3 is a perspective view of the assembly of the stator and the inner frame of the first embodiment seen from the x-axis positive direction.

The motor 1 includes an annular stator 2, a rotor (not shown) housed in the inner peripheral side of the stator 2, a motor case 4 that accommodates the stator 2, and an inner frame 3 that fixedly supports, as an annular support member, one axial end of the stator 2 with respect to the motor case 4. FIG. 1 shows cross-sections of the motor 1 taken along planes passing through the axis O. For convenience of explanation, the cross sections are shown respectively passing through the axis of the bolts 5 and 6. An axis X is provided in a direction in which the axis O extends and the positive direction thereof is defined as a side on which the inner frame 3 is disposed with respect to the stator 2 (or a side on which a bottom portion 4b of the motor case 4 is disposed). FIG. 2 is a perspective view of the combined assembly of the stator 2 and the inner frame 3 as seen from the x-axis negative direction, while FIG. 3 is a perspective view of the assembly as seen from the x-axis positive direction.

The stator 2 includes a stator core 2a and a coil 2b wound around the stator core 2a. The stator core 2a is of annular circular shape (hollow cylindrical shape) and has a plurality of teeth 20 (eighteen teeth in the embodiment) arranged on the inner peripheral surface thereof annularly in the circumferential direction. Each tooth 20 is arranged to extend in a radial direction, and a slot 21 is formed between the adjacent teeth 20, 20. A winding of the coil 2b is wound around the teeth 20 to be fitted into the slot 21. The stator core 2a, for example, is constituted by placing a plurality of core pieces (the split stator cores) in an annular shape. The core piece, for example, is constituted by laminating electromagnetic steel sheets of the magnetic material in the axial direction. The stator core 2a has a plurality of bolt fastening portions 22 (three in this embodiment) on the outer peripheral surface. The bolt fastening portion 22 is a stator flange portion disposed to protrude from the outer circumferential surface of the stator 2 radially outward and formed at substantially equal intervals in the circumferential direction (shifted by 120 degrees from each other). The bolt fastening portion 22 is formed with a hole 220 in the axial direction for inserting a fastening bolt 5.

The rotor is disposed on the inner periphery of the stator 2 substantially coaxially with the stator 2. The rotor is disposed with a radial gap (clearance in the radial direction) with respect to the stator 2, and magnetic paths are formed through this gap. The rotor, for example, has a rotor core constructed by laminating a plurality of electromagnetic steel plates and a plurality of permanent magnets which are located (embedded) into the rotor core. An output shaft of the motor 1 (now shown) is fixedly mounted on the rotor outside the figure of the motor 1. The output shaft is rotatably supported with respect to a wheel support member by bearings which are arranged axially on both sides of the rotor. One end of the output shaft (x-axis positive direction side near the wheel) is supported rotatably by a bearing disposed in the radially inner side of the motor case 4 and coupled to the wheel (wheel hub). When energizing the stator 2, the rotor is rotated by electromagnetic force which is generated by the stator 2. The rotational driving force output from the motor 1 is transmitted to the wheels through the output shaft as a rotating force. By allowing the wheel to rotate with the output shaft, it is possible to integrally rotate the output shaft and the wheel to thereby allow the running of the electric vehicle. During regenerative braking of the vehicle, the wheel is rotated by the inertia force of the vehicle body. The motor 1 is driven through the output shaft by the rotation force from the wheel. In this case the motor 1 operates as a generator, and the generated power is stored in battery via an inverter.

The motor case 4 represents an outer frame of the motor 1 (outer frame). The motor case 4 has a function of protecting the stator 2 and the like from the outside of the motor and is fixedly mounted with respect to the wheel support member. As shown in FIG. 1, the motor case 4 is of a bottomed cylindrical shape, and has a cylindrical portion extending in an axial direction and a bottom portion 4b expanding radially. A bracket 40 is provided for fixing the motor case 4 to the wheel support member. A substantially cylindrical bearing portion 41 is provided for rotatably supporting the output shaft on the radially inward side of the bottom portion 4b. The bottom portion 4b includes a bolt fastening portion 42 of substantially annular shape surrounding the bearing portion 41 (bearing). The bolt fastening portion 42 is disposed integrally with the bearing portion 41 at the outer peripheral side of the bearing portion 41 (bearing). The bolt fastening portion 42 includes a plurality of holes (internal thread portion, eight bolts in the present embodiment) 420 in a bag shape for fastening bolts 6 arranged substantially equidistantly in a circumferential direction. The bolt fastening portion 42 is formed to be thicker and of relatively higher rigidity in the x-axis direction compared to other portions of the bottom portion 4b so as to secure a sufficient strength around the hole 420. In the inner peripheral (radially inward) side of the motor case 4 (i.e. cylindrical portion 4a), the stator 2 is arranged substantially coaxially with the motor case 4 (cylindrical portion 4a). The stator 2 is disposed in the motor case 4 (cylindrical portion 4a) with a radial gap (radial clearance) CL1.

The inner frame 3 is disposed in an inner side of the motor 1 and intended to be a support member for supporting the stator 2 with respect to the motor case 4. The inner frame 3 is formed, for example, of an aluminum-based or iron-based metal material. The inner frame 3 is donut-type disc-shaped, and has a cylindrical portion 3a extending in the axial direction with a donut shaped circular plate portion 3b extending radially inwardly from the inner periphery at one axial end of the cylindrical portion 3a (on the x-axis positive direction side). The cylindrical portion 3a has a plurality of bolt fastening portions 30 (three in this embodiment) on the outer peripheral surface. The bolt fastening portions 30 are inner frame side flange portions formed to protrude radially outward from the outer peripheral surface of the cylindrical portion 3a with substantially equal intervals to each other in the circumferential direction (shifted by 120°). Each bolt fastening portion 30 is formed with a hole 300 (internal thread portion) into which a fastening bolt 5 is inserted in the axial direction.

When viewed from the x-axis direction, in a state in which the inner frame 3 (cylindrical portion 3a) and the stator (stator core 2a) are positioned relative to each other such that the hole 300 of the bolt fastening portion 30 of the cylindrical portion 3a is substantially aligned with the hole 220 of the bolt fastening portion 22 of the stator 2, the fastening bolts 5 is inserted from the x-axis negative direction side in both holes 300 and 320 to be fastened. Thus, the inner frame 3 (cylindrical portion 3a) is fixed to the stator 2 (stator core 2a). That is, the bolt fastening portion 30 represents a coupling portion between the inner frame 3 and the stator 2 (first coupling portion) and is disposed radially outwardly of the inner frame 3. Note that the outer peripheral surface 34 radially outward of the cylindrical portion 3a is configured to be accommodated within the radially outward outer peripheral surface 23 of the stator core 2a. The inner frame 3 (cylindrical portion 3a) is placed with a radial gap (radial clearance) CL2 with respect to the motor case 4 (cylindrical portion 4a) in a state coupled to the stator 2.

A through hole 31 is disposed in substantially the center of the plate portion 3b. Further, fastening portions 32 are disposed in the substantially annular shape surrounding the through hole 31. A bearing portion 41 of the motor case 4 is installed to be fitted into the through hole 31. The bolt fastening portions 32 are formed with a plurality of through holes 320 (eight in the present embodiment) in the axial direction and arranged in a circumferential direction at substantially equal intervals. The fastening bolts 6 are inserted into each hole 320. As shown in FIG. 2, in terms of x-axis negative direction side of the plate portion 3b, on the periphery of each hole 320, the recess 321 is disposed in the thin-walled provided for other parts of the bolt 6. As shown in FIG. 2, on the surface of the x-axis negative direction of the plate portion 3b, at the periphery of each hole 32, a recess 321 is formed with a wall thickness thinner than other portions of the bolt fastening portions 32. As shown in FIG. 1, a head of the fastening bolt 6 is accommodated in the recess 321. When viewed from the x-axis, in a state the inner frame 3 (plate portion 3b) is positioned relative to the motor case 4 such that the hole 320 of the bolt fastening portion 32 of the plate portion 3b is substantially aligned with the hole 420 of the bolt fastening portion 42 of the motor case 4, the fastening bolt 6 is inserted from the negative x-axis direction side in both holes 320 and 420 for fastening. Thus, at a radially inward position than the stator core 2a, the inner frame 3 is secured by bolts 6 to the motor case 4. That is, the bolt fastening portions 32 represent a coupling portion (second coupling portion) between the inner frame 3 and the motor case 4, and are disposed radially inward of the inner frame 3. While the inner frame 3 is coupled to the stator 2, the bolt fastening portions 32 are located radially inward of the stator core 2a.

The inner frame 3 is configured to be coupled to the stator 2 at the cylindrical section 3a (first coupling portion) while being coupled to the motor case 4 at the inner periphery side of the plate portion 3b (second coupling portion). That is, the inner frame 3 supports the stator 2 relative to the motor case 4 in a position radially inner side of the stator 2. The stator 2 is coupled to the motor case 4 through the inner frame 3 such that the axial center thereof substantially coincides with the axis O of the motor case 4. Thus, one axial end of the stator 2 (end of the x-axis positive direction) is supported in a cantilevered manner with respect to the motor case 4.

The plate portion 3b of the inner frame 3 includes a connecting portion 33 radially outward of the bolt fastening portions 32 and radially inward than the cylindrical portion 3a (bolt fastening portion 30). The connecting portion 33 is a portion for connecting the cylindrical portion 3a and the bolt portions 32 and formed in a substantially circular ring shape surrounding the bolt fastening portions 32 and has a thin-walled portion with a small x-axis dimension than the bolt fastening portions 32. The plate portion 3b is disposed in the positive x-axis direction end of the cylindrical portion 3a, and, in a state in which the inner frame 3 (cylindrical portion 3a) is coupled with the stator 2, the connecting portion 33 is disposed with respect to the stator coil 2b with an axial gap (x-axis gap or clearance corresponding to the x-axis direction dimension of the cylindrical portion 3a). Further, in a state in which the inner frame 3 (bolt connecting portion 32) is coupled to the motor case 4, the connecting portion 33 is disposed with an axial gap (axial direction clearance) CL4 with respect to the motor case 4 (bottom portion 4b). As lightening holes, a plurality of through holes 330 (eighteen in the present embodiment) are formed axially in the connecting portion 33 at substantially equal intervals in the circumferential direction. It should be noted that the lightening part may be formed in a bag-shaped hole (recess) and the like instead of the through-hole 330.

The rigidity of the inner frame 3 is configured to be lower than the rigidity of the motor case 4. More specifically, the radial rigidity or stiffness of the plate portion 3b (connecting portion 33) of the inner frame 3 is configured to be lower than the radial rigidity of the bottom portion 4b of the motor case 4. Further, by providing a plurality of lightening portions (holes 330) arranged in a circumferential direction, compared to a case in which these lightening parts (holes 330) are not provided, the radial rigidity of the inner frame 3 at the connecting portion 33 (between bolt fastening portions 30 and 32) is set lower. In addition, by providing the lightening portions (holes 330), the radial rigidity at the connecting portion 33 (between the bolt connecting portions 30, 32) is reduced than the rigidity of the same plate section 3b in the circumferential direction of the plate portion 3b (connecting portion 33).

Operation

Now, a description is given of the operational effects. The motor 1 vibrates at the time of generation of a driving force as an electric motor and at the time of generation of electrical power as a generator. The stator core 2a is an oscillation source of the vibration of the motor 1, and, when the electromagnetic exciting force of the stator core 2a is transmitted to the motor case 4, the noise is emitted to the outside of the motor case 4 occurs. For example, the stator core 2a vibrates radially with relatively large amplitude in the outer periphery. Vibration and noise are generated due to such a radial magnetic excitation force of the stator 2. At the time of the relative rotation between the rotor and the stator 2, each time the magnetic pole of the rotor crosses the opening portion of the slot 21 disposed in the stator 2, the magnetic path of the field flux generated from the magnetic pole of the rotor changes periodically so as to cause change in the magnetic flux distribution in the gap, and the electromagnetic exciting force of the stator 2 is generated. The rotational order, special order, and the amplitude of the radial electromagnetic excitation force are dependent on the number of magnetic poles of the motor 1 (number of poles of the effective magnetic pole opening angle and the number of slots 21 disposed in the stator 2) and the like. As the vibration mode due to radial electromagnetic excitation force, a circular 0-order mode and the like may be mentioned, in which the stator 2 vibrates in phase in the radial direction of the motor 1. When the electromagnetic exciting force that depends on the number of magnetic poles of the motor 1 excites a resonant mode attributable to the structure of the motor case 4, noise of the high tone becomes harsh.

If the outer periphery of the stator 2 is fixed onto the inner periphery of the motor case 4, the vibration of the stator 2 is transmitted to the motor case 4 in a relatively short vibration transmission path. In addition, if the stator 2 is supported by the inner peripheral surface 43 of the motor case 4, the stator 2 and the motor case 4 come into surface contact to thereby cause the radial vibration of the stator 2 to the motor case 4 directly via the contact surface so that the noise to the outside of the motor case 4 is increased. For example, in the structure in which the stator 2 is shrink-fitted on the inner periphery of the motor case 4, the vibration due to the electromagnetic exciting force of the stator 2 of the ring 0th-order mode will be transmitted directly to the motor case 4. Therefore, the motor noise nth order will be deteriorated. Here, the "motor noise n-th" represents that the motor is rotated n turns to cause the vibration once. Thus, in a structure of the fixing or supporting described above, it is impossible to reduce the vibration transmitted the stator 2 to the motor case 4, so that the sound vibration performance of the motor 1 is likely to be deteriorated. In contrast, in the present embodiment, a floating structure is employed in which the stator 2 is supported in a floating state with respect to the motor case 4. Specifically, the stator 2 is separated from the inner periphery of the motor case 4 in the radial direction, and the stator 2 is fixed to the site of the motor case 4 away from the stator 2 in the axial direction. Thus, it is possible to reduce the noise from the motor 1, which makes the driver to feel uncomfortable. Consequently, it is possible to provide a comfortable cabin space.

Also, if the stator 2 is supported directly by the motor case 4, vibration occurring in the stator 2 is transmitted directly to the motor case 4. Thus, the motor case 4 becomes a vibration source, and large noise occurs. For example, if the stator 2 is fixed directly, i.e., without via the inner frame 3, to the motor case 4 with bolts 5, the vibration energy applied to the stator 2 is through the integrated fixation site by bolts 5 (i.e., without being reduced) transmitted to the motor case 4. In this case, since the stator 2 is structured to be supported on the motor case 4 at three points by three bolts 5, the structure is more advantageous than the case of the stator 2 being shrink fitted on the inner periphery of the motor case 4 (36th order of the motor noise due to the circular zero-order mode is improved to some extent). However, the influence of vibration caused by the circular ring 0th-order mode would remain. Further, motor noise 12th deteriorates due to a circular ring 3rd mode of vibration in which vibrations occur with the supporting portions by bolts exhibiting antinodes. In contrast, in the present embodiment, by fixing the stator 2 through the inner frame 3 to the motor case 4, part of the vibration energy applied to the stator 2 is consumed for elastically deforming the inner frame 3. Therefore, the vibration energy transferred to the motor case 4 can be reduced through the inner frame 3. Thus, such a situation may be suppressed in which the motor case 4 is vibrated so that the motor case 4 itself becomes a vibration and noise source. This makes it possible to reduce the noise from the motor 1, which would cause the driver to feel discomfort. Therefore, it is possible to provide a comfortable cabin space.

More specifically, in a state of supporting the stator 2 to the motor case 4 via the inner frame 3, a gap in the radial direction or a radial gap (clearance) CL1 is disposed between the radially outer peripheral surface 23 of the stator 2 (stator core 2a) and the radially inner peripheral surface 43 of the motor case 4 (cylindrical portion 4a). Similarly, a radial gap CL2 is provided. That is, the inner frame 3 is configured to be fixed or secured to the bottom portion 4b of the motor case 4, which is away with respect to the stator 2 in the axial direction (x-axis direction), rather than fixed to the radially inside of the inner peripheral surface 43 of the bottomed cylindrical motor case 4 (cylindrical portion 4a). Therefore, it is possible to avoid a situation in which the vibration of the stator 2 in the radial direction of the stator 2 is transmitted to the motor case 4 via a contact surface in the radial direction. Furthermore, between the stator 2 and the inner frame 3 (connecting portions 33), and between the motor case 4 and the inner frame 3 (connecting portions 33), clearances CL3, CL4 are respectively provided. Therefore, the vibration from the stator 2 is transmitted to the motor case 4 exclusively via the connecting portion 33 between the bolt fastening portions 30, 32 of the inner frame 3 to the motor case 4. Therefore, the vibration of the motor 1 is transmitted to the outside through a relatively long vibration transmission path with the vibration being transmitted attenuated. Therefore, the vibration transmitted from the stator 2 to the motor case 4 is reduced, and since the vibrations and noise of motor 1 to emitted to the exterior is reduced, it is possible to improve sound vibration performance of the motor 1. In addition, the gap CL1 (the gap CL2) is sufficient if dimensioned to provide a clearance that prevents the inner peripheral surface 43 of the motor case 4 from being surface contacted to the outer peripheral surface 23 of the stator (outer peripheral surface 34 of the inner frame 3). Thus, the gap is not necessarily required to an air void, but a buffer material or the like may be interposed to fill the gap CL1 (CL2).

Note that the stator 2 might be configured to be double-supported by the motor case 4 (i.e., the stator 2 is supported at both axial ends of the motor case). However, in this case, vibration in the radial direction of the stator 2 will be transmitted to the motor case 4 via the support portions in the axial direction on both sides of the stator 2. Therefore, the vibration transmitted from the stator 2 to the motor case 4 cannot be sufficiently reduced, so that the sound vibration performance of the motor 1 is likely to be deteriorated. In contrast, in the present embodiment, a cantilever supporting structure for the stator with respect to the motor case 4 is provided. Therefore, the vibration transmission path to the motor case 4 is limited only in the one axial end from the stator 2, whereby it is possible to reduce the vibration transmitted from the stator 2 to the motor case 4 to thereby improve the sound vibration performance of the motor 1.

Figure 4:
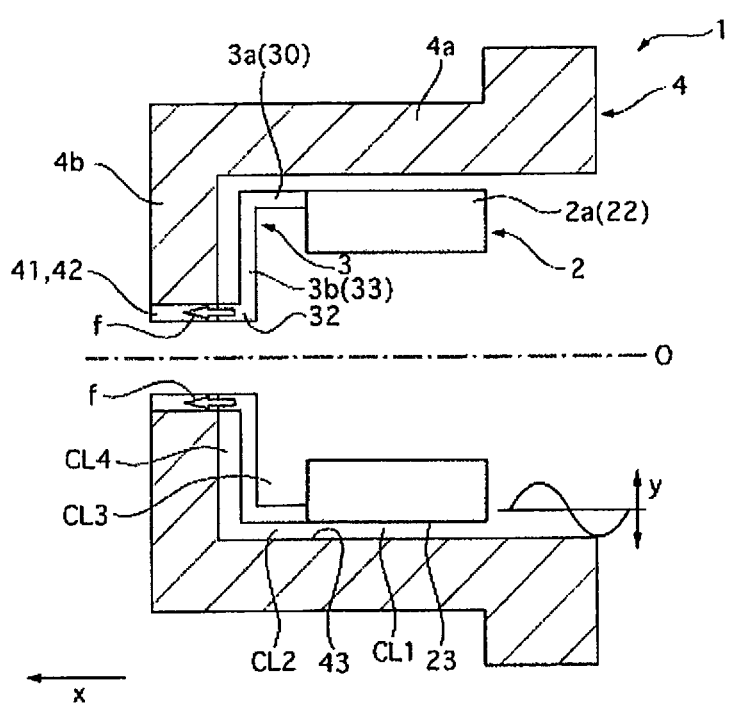
FIG. 4 is a schematic sectional view of the motor of the first embodiment taken along a plane passing through the axis O.

FIG. 4 shows a schematic cross sectional view of the motor 1 taken along a plane passing through the axis O thereof. Due to the electromagnetic exciting force, the stator 2 is vibration displaced in the radial direction in the circular 0-order harmonic mode. A radial displacement amount at this time is defined by "y". When the radial rigidity of the portion (connecting portion 33) between the bolt fastening portions 30, 32 of the plate portion 3b of the inner frame 3 is defined by "k", while the radial force transmitted from the inner frame 3 to the motor case 4 is defined by "f", the expression, f=k×y, is established, In other words, the plate portion 3b (connecting portion 33) of the inner frame 3 functions as an elastic member (spring) for absorbing the radial displacement (vibration), and the radial rigidity or stiffness k may be regarded as a spring constant. In the present embodiment, by adjusting a value of spring constant (rigidity) k to thereby reduce the force f, the vibration or noise of the motor 1 will be reduced to be emitted to the exterior. More specifically, the radial rigidity k of the connecting portion 33 is configured to be lower than the radial rigidity of the bottom portion 4b of the motor case 4. Thus, as compared to a case in which the rigidity k is set to equal to or higher than the rigidity of the bottom portion 4b of the motor case 4, the force f may be reduced, and the function of the inner frame 3 as a vibration absorbing member may be sufficiently exhibited to reduce the vibration transmitted from the stator 2 to the motor case 4. Thus, the connecting portion 33 of the inner frame 3 represents a radial vibration suppressing portion for reducing vibration transmission force in the radial direction of the inner frame 3 (vibration transmitted to the motor case 4 through the inner frame 3 in the radial direction).

Incidentally, in a conceivable construction, the inner frame 3 is disposed to the outer peripheral surface 23 of the stator 2 in addition to the axial end of the stator 2 (the stator core 2a). For example, with the inner frame 3 being formed by a bottomed cylindrical shape, it is conceivable to arrange the cylindrical portion thereof radially outward of the stator core 2a. However, in this case, there is a possibility of higher radial stiffness of the inner frame 3 (plate portion 3b). In contrast, in this embodiment, the inner frame 3 is not placed in the radially outward position of the stator core 2a, so that the radial rigidity of the inner frame 3 (plate portion 3b) may be reduced more reliably. Further, while ensuring the radial dimension of the stator 2, it is possible to suppress the enlargement of the overall radial dimension of the motor 1.

The plate portion 3b (connecting portion 33) includes a plurality of holes 330, as lightening portions. By providing the lightening portions, it is possible to facilitate that the rigidity k is set lower than the bottom portion 4b of the motor case 4. In addition, since the main direction of the vibration transmitting path through the inner frame 3 (connecting portion 33) by the electromagnetic exciting force of the stator 2 is in the radial direction, if the radial rigidity of the inner frame 3 is high, the inner frame 3 transmits the radial magnetic excitation force of the stator 2 without subject to sufficient reduction. Therefore, it is not possible to sufficiently suppress noise. In contrast, in this embodiment, by providing lightening portions (holes 330) in the connecting portion 33 of the inner frame 3, as compared to the case without the lightening portions (holes 330) being provided, the radial rigidity k of the inner frame 3 at the connecting portion 33 thereof is reduced. Thus, by reducing the radial rigidity k of the inner frame 3 (connecting portion 33), it is possible to more effectively reduce the radial vibration energy (force f) transmitted from the stator 2 in the radial direction to the motor case 4 via the inner frame 3.

Further, in this embodiment, by providing the lightening portions (the holes 330), the radial rigidity k at the plate portion 3b (connecting portion 33) is set lower than the rigidity in the circumferential direction. By reducing the rigidity of the inner frame 3 in the redial direction which represents the main input direction of the electromagnetic excitation force of the stator 2 to the inner frame 3 than in the other direction (i.e. in the circumferential direction, for example it is possible to reduce the vibration energy (force f) more effectively. When providing the lightening portions (holes 330), however, it is obviously preferable to maintain the overall strength of the inner frame 3 (supporting strength of the stator 2 by the inner frame 3). Note that the configuration for setting a low rigidity or stiffness k is arbitrary and the low rigidity k may be set by adjusting, for example, simply the thickness of the connecting portion 33. Also, when adjusting the rigidity k by providing the lightening portions as in this embodiment, the structure is not limited to through holes, grooves, or recess etc. of arbitrary size and shape may be provided. In the present embodiment, by providing the through holes 330 as lightening portion, it is possible to reduce the radial rigidity k more effectively while increasing the lightening amount to thereby obtain the lightweight inner frame 3 (connection portion 33). Thus, it is possible to reduce the overall weight of the motor 1.

Figure 5:
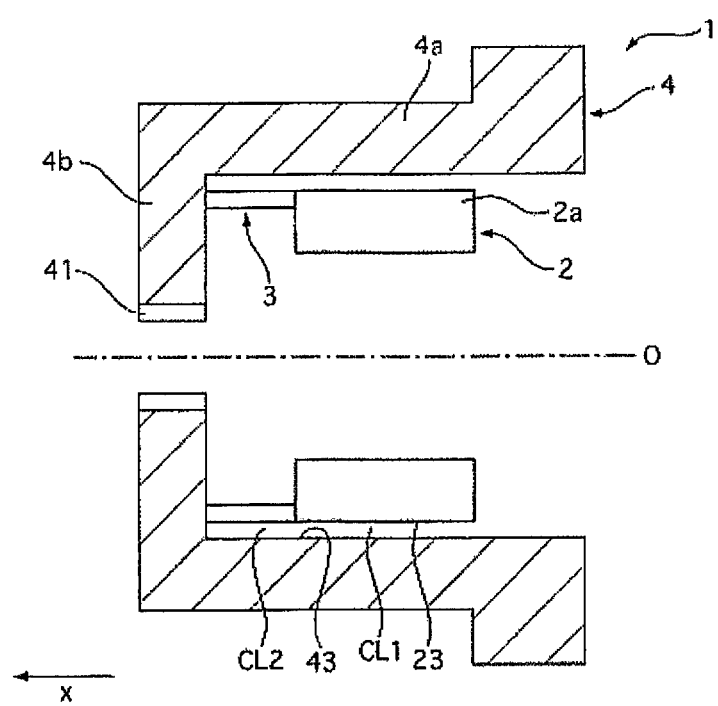
FIG. 5 is a schematic sectional view of the motor of another embodiment taken along a plane passing through the axis O.

FIG. 5 a schematic sectional view of the motor, similar to that in FIG. 4, in which the inner frame 3 is coupled to the motor case 4 at substantially the same radial position of the stator 2. As in the present case, instead of the inner frame 3 being formed in a donut-type disc-shaped and coupled to the motor case 4 radially inwardly of the stator 2 as in the present embodiment, the inner frame may be formed in substantially cylindrical shape and coupled to the motor case 4 at substantially same radial position as the stator 2 (fixing point on the side of the stator 2 of the inner frame 3). In this case, as well, it is possible to obtain the same effects as described above by reducing the rigidity k in the radial direction of the inner frame 3.

Incidentally, instead of coupling the donut-like, disk-shaped inner frame 3 to the motor case 4 radially inward of the stator as in the present embodiment, the coupling may be made to the motor case 4 at a position radially outward of the stator 2. However, in this case, due to the radial electromagnetic excitation force of the stator 2, a unique resonant mode of the motor casing 4 itself is excited. Thus, there is a possibility that the vibration amplified in the vibration transfer characteristic is inputted to the motor case 4. In other words, subjected to vibration amplification by resonance mode of the motor case 4, the vibration and noise of the motor 1 is likely to be deteriorated. Also, there is a possibility that the radial dimension of the motor case 4 is increased. By shortening the radial dimension of the connecting portion 33 of the inner frame 3 (the vibration transmission path length from the stator 2 to the motor case 4) in order to avoid this size increases, the effect of reducing vibration transmitted from the stator 2 to the motor case 4 will be insufficient, so that the vibration or noise of the motor 1 is likely to be deteriorated.

In contrast, in the present embodiment, the inner frame 3 is coupled to the motor case 4 at a position radially inner side of the stator 2. Therefore, the above disadvantages may be avoided, the size of the motor 1 is suppressed, and the sound and vibration performance of the motor 1, etc. may be improved while avoiding the above stated inconveniences. For example, it is possible to suppress the amplitude of the vibration due to excitation of the resonance mode of the motor case 4 due to the electromagnetic exciting force of the stator 2. It is also possible to reduce the magnitude of the electromagnetic exciting force itself transferred from the stator 2 to the motor case 4. That is, since the main direction of vibration which comes through the inner frame 3 by the electromagnetic exciting force of the stator 2 is the radial direction, the vector of the force f to be inputted from the inner frame 3 to the bottom portion 4b of motor case 4 (bolt fastening portion 42) is symmetrical (in opposite directions) with respect to the axis O. Here, at the bottom portion 4b of the motor case 4, since the bolt fastening portion 42 is positioned radially inward than the outer diameter of the motor case 4 (bottom portion 4b), the radius of the bolt fastening portion 42 is relatively small (i.e., relative to radially outer portions at the bottom portion 4b) small. Thus, in the bolt fastening portion 42, it is possible to reduce the symmetric forces f (in the opposite directions) by canceling each other. Also, the rigidity of the bolt fastening portion 42 representing the coupling portion of the inner frame 3 (bolt fastening portion 32) is relatively large (i.e., relative to the radially outward portion in the bottom portion 4b) large. Thus, in the bolt fastening portion 42, it is easy to reduce the above described symmetrical forces (in the opposite direction from each other) by canceling each other. In other words, in the present embodiment, the vibration in the radial direction is transmitted concentrated to the part that is of small radius and of high rigidity, it is intended to achieve that the vibrations of the opposite directions are intended to be offset each other in this part.

Here, the bolt fastening portion 42 is provided integrally with the bearing portion 41 which is provided for rotatably supporting the rotor. In other words, the inner frame 3 (bolt fastening portion 32) is coupled via the bolt fastening portion 42 to the bearing portion 41 provided with a thick wall for rotatably supporting the rotor. Thus, by connecting (coupling) the inner frame 3 (bolt fastening portion 32) to the portion of originally high rigidity in the motor case 4 (i.e. bearing portion 41, bolt fastening portion 42), it is possible to effectively obtain the vibration cancelling effects while simplifying the structure of the motor 1. Note that, by providing the bolt fastening portion 32 (bolt fastening portion 42) radially inwardly of the stator core 2a, it is easy to fasten the inner frame 3 and the motor case 4 by the bolt 6 from the x-axis negative direction as well.

Effects

The following lists the effects achieved by a motor 1 or a stator support structure in the first embodiment.

(1) Provided are an annular stator 2;
a motor case 4 disposed radially outward or inner side of the stator 2 with a predetermined gap (radial clearance CL1);
an inner frame 3 (support member) that fixedly supports one end of the axial direction (x-axis positive direction end) of the stator 2 with respect to the motor case 4, wherein the inner frame 3 includes a bolt fastening portion (a first coupling portion) coupled to the one end of the stator in a state of being uncoupled to the motor case 4, a bolt fastening portion 32 (second coupling portion) coupled to the motor case in a state of being uncoupled to the one end of the stator, and a connecting portion that connects the first coupling portion 30 and the second coupling portion 32, and wherein the radial rigidity k at the connecting portion 33 of the inner frame 3 is configured to be lower than the radial rigidity of the bottom portion 4b (a portion for supporting the stator 2 via the inner frame 3) of the motor case.

As described above, in the radial direction representing the main input direction of the electromagnetic exciting force of the stator 2 to the inner frame 3, the rigidity k at the connecting portion 33 of the inner frame 3 is configured to be lower than the bottom portion 4b (portion for supporting the stator 2 via the inner frame 3) of the motor case 4.

Therefore, it is possible to more effectively suppress the noise by fully exhibiting the function as a vibration absorbing member of the inner frame 3.

(2) The bolt fastening portion 32 (second coupling portion) is disposed radially inward of the stator 2.

Therefore, it is possible to suppress the resonance mode of the motor case 4 from being excited with the amplitude being amplified. Also, it is possible to reduce vibrations by canceling the vibration transmitted to the motor case 4.

(3) The connecting portion 33 is plate-shaped extending in the radial direction of the stator 2 provided with lightening portions (holes 330).

Therefore, it is possible to reduce the radial rigidity of the connecting portion 33.

Other Embodiments

Although the configurations of the present invention has been described by way of the embodiments based on the drawings, specific structure of the present invention is not intended to be limited to the embodiments. The change in design or the like without departing the gist of the invention may be included in the scope of the present invention.

The invention claimed is:

1. A rotating electrical machine, comprising:
    an annular stator having two axial ends disposed opposite each other in an axial direction along an axial center axis of the rotating electrical machine;
    a motor case disposed radially outward of the stator with a first radial gap between the motor case and the stator in a radial direction with respect to the axial center axis; and
    a support member that fixedly supports one of the axial ends of the stator with respect to the motor case and does not support the other of the axial ends of the stator such that the stator is supported in a cantilevered manner, the support member including
        a first coupling portion coupled to the one of the axial ends of the stator, the first coupling portion being spaced from the motor case,
        a second coupling portion disposed radially inward of the first coupling portion in the radial direction and coupled to the motor case at a position spaced radially inward of the one axial end of the stator, and
        a connecting portion disposed between the first coupling portion and the second coupling portion in the radial direction and connecting the first coupling portion and the second coupling portion, a radial rigidity at the connecting portion of the support member being lower than a radial rigidity of a portion of the motor case supporting the stator via the support member.

2. The rotating electrical machine as claimed in claim 1, wherein the connecting portion is plate-shaped and extends in a radial direction of the stator, and includes a lightening portion.

3. The rotating electrical machine according to claim 1, wherein
    the support member includes a cylindrical portion and a plate portion, the plate portion having a circular donut shape with a through hole disposed in a center of the plate portion, the cylindrical portion extending in the axial direction from a radially outer portion of the plate portion,
    the first coupling portion is provided on an outer periphery of the cylindrical portion, and
    the second coupling portion and the connecting portion are provided on the plate portion.

4. The rotating electrical machine according to claim 3, wherein
    a bearing portion of the motor case is arranged fitted in the through hole.

5. The rotating electrical machine according to claim 3, wherein
    a lightening part is provided on the connecting portion.

6. The rotating electrical machine according to claim 5, wherein
    the lightening part includes holes passing through the connecting portion.

7. The rotating electrical machine according to claim 3, wherein
    the cylindrical portion is disposed between the plate portion and the stator in the axial direction such that a first axial clearance exists between the stator and the plate portion.

8. The rotating electrical machine according to claim 1, wherein
    a second radial gap exists between the support member and a radially inner peripheral surface of the motor case.

9. The rotating electrical machine according to claim 1, wherein
    a second axial clearance exists between the connecting portion of the support member and the motor case.

10. The rotating electrical machine according to claim 1, wherein
    the motor case has a bottomed cylindrical shape and includes a bottom portion at one axial end of the motor case, and
    the second coupling portion is coupled to the bottom portion and disposed axially between the stator and the bottom portion.

11. A stator supporting structure for a rotating electrical machine including an annular stator having two axial ends disposed opposite each other in an axial direction along an axial center axis of the rotating electrical machine and a motor case disposed radially outward of the stator with a predetermined radial gap between the motor case and the stator in a radial direction with respect to the axial center axis, the stator supporting structure comprising:
    a support member configured to fixedly support one of the axial ends of the stator with respect to the motor case in a cantilevered manner, the support member including
        a first coupling portion configured to be coupled to one of the axial ends of the stator while being spaced from the motor case,
        a second coupling portion disposed radially inward of the first coupling portion in the radial direction and configured to be coupled to the motor case at a position spaced radially inward of the one axial end of the stator, and
        a connecting portion disposed between the first coupling portion and the second coupling portion in the radial direction and connecting the first coupling portion and the second coupling portion, the connecting portion including a lightening part to reduce a radial rigidity of the connecting portion.

12. The stator supporting structure according to claim 11, wherein
    the support member includes a cylindrical portion and a plate portion, the plate portion having a circular donut shape with a through hole disposed in a center of the plate portion, the cylindrical portion extending axially from a radially outer portion of the plate portion, the first coupling portion is provided on an outer periphery of the cylindrical portion, and the second coupling portion and the connecting portion are provided on the plate portion.

13. The stator supporting structure according to claim 12, wherein the through hole is configured to receive a bearing portion of the motor case such that the bearing portion is fitted in the through hole.

14. The stator supporting structure according to claim 11, wherein the lightening part includes holes passing through the connecting portion.

* * * * *